US 6,727,013 B2

(12) United States Patent
Wheat et al.

(10) Patent No.: US 6,727,013 B2
(45) Date of Patent: Apr. 27, 2004

(54) FUEL CELL ENERGY MANAGEMENT SYSTEM FOR COLD ENVIRONMENTS

(75) Inventors: William S. Wheat, Rochester, NY (US); Mark A. Meltser, Rochester, NY (US); David A. Masten, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 112 days.

(21) Appl. No.: 09/948,897

(22) Filed: Sep. 7, 2001

(65) Prior Publication Data

US 2003/0049504 A1 Mar. 13, 2003

(51) Int. Cl.[7] ................................................ H01M 8/04
(52) U.S. Cl. .............................. 429/24; 429/12; 429/13; 429/22; 429/23
(58) Field of Search ............................. 429/12, 13, 22, 429/23, 24

(56) References Cited

U.S. PATENT DOCUMENTS 6,479,177 B1 * 11/2002 Roberts et al. ............. 242/374
6,489,048 B1 * 12/2002 Ernst et al. .................. 429/13
2003/0022031 A1 * 1/2003 Manery ......................... 429/7

OTHER PUBLICATIONS

EVS–14 Proceedings of the Electric Vehicle Association of America; Dec. 15–17 1997; Orlando Florida.

* cited by examiner

Primary Examiner—Patrick Ryan
Assistant Examiner—Dah-Wei D. Yuan
(74) Attorney, Agent, or Firm—Cary W. Brooks; Linda M. Dreschere

(57) ABSTRACT

An energy management system controls the temperature of a fuel cell system while a vehicle is not running. The energy management system includes a fuel cell stack, a blower that provides air to the fuel cell stack, a water supply, and a hydrogen supply. A hydrogen supply valve is connected between the hydrogen supply and the fuel cell stack. A heater is connected to an output of the fuel cell stack. A controller controls the hydrogen supply valve and the blower to power the heater to warm the fuel cell stack and the water supply. The controller starts the blower and opens the hydrogen supply valve if heating is necessary and if a tank level signal exceeds a first tank level value. The controller activates a purge, drains water from the water supply, and inhibits vehicle startup if the tank level signal does not exceed a first tank level value.

33 Claims, 3 Drawing Sheets

FUEL CELL ENERGY MANAGEMENT SYSTEM FOR COLD ENVIRONMENTS

FIELD OF THE INVENTION

The present invention relates to fuel cells, and more particularly to fuel cell energy management systems for cold environments.

BACKGROUND OF THE INVENTION

Fuel cell systems are increasingly being used as a power source in a wide variety of applications. Fuel cell systems have also been proposed for use in vehicles as a replacement for internal combustion engines (ICE). A solid-polymer-electrolyte membrane (PEM) fuel cell includes a membrane that is sandwiched between an anode and a cathode. To produce electricity through an electrochemical reaction, hydrogen (H2) is supplied to the anode and oxygen (O2) is supplied to the cathode.

In a first half-cell reaction, dissociation of the hydrogen $H_2$ at the anode generates hydrogen protons $H^+$ and electrons $e^-$. The membrane is proton conductive and dielectric. As a result, the protons are transported through the membrane while the electrons flow through an electrical load that is connected across the membrane. In a second half-cell reaction, oxygen $O_2$ at the cathode reacts with protons $H^+$, and electrons $e^-$ are taken up to form water $H_2O$.

The operation of ICE in cold weather has received intensive attention during the development of ICEs. Because fuel cells have become viable for widespread commercial use, cold weather performance characteristics of fuel cells have become more important. Vehicle manufacturers must address customer requirements and expectations to ensure that fuel cells are accepted. Some of these requirements include an affordable purchase price and operating costs, reliable and safe operation, traffic compatible performance such as acceleration and braking, range, payload, and ambient temperature tolerance.

The ambient temperature tolerance specification for vehicles typically includes temperatures between −40° C. to 52° C. Exemplary cold weather specifications for ICEs typically require that an engine must start within 30 seconds of cranking time with front and rear window defrosters operating. These specifications also require stable operation in low ambient temperatures such as −40° C. following a soak for eight hours at the low ambient temperature. Shortly after starting, the vehicle should be capable of driving away at varying rates of acceleration including wide-open throttle. Fuel cell vehicles will probably be required to meet similar cold weather specifications to meet consumer expectations.

Consumers expect automobiles to be operable in sub-freezing weather. Liquid and vapor water within the fuel cell system is a major concern for cold weather operation of the fuel cell. The cooling system typically employs de-ionized water. The fuel cell stack humidification systems and water generation at the cathode during operation generally ensures that water in a liquid or vapor state will exist in almost all parts of the fuel cell stack during dwell times. At one atmosphere and temperatures below 0° C., water freezes and may block the flow passages of the fuel cell stack. These blockages may expand and damage the fuel cell stack and/or render the cooling and humidification systems inoperable.

There are many approaches to prevent freezing within a fuel cell system during operation and/or as part of the start-up process. Passive freeze prevention involves several different approaches. One approach minimizes freezing by minimizing the use of water coolant. The water coolant can be replaced with a low freezing temperature heat transfer liquid that is not electrically conducting. Several major fuel cell suppliers are working in this area. Another option to limit the pure water coolant is to operate with separate stack and radiator coolant loops using a liquid-to-liquid heat exchanger. This approach, however, adds cost, weight and volume.

Another approach involves removing the water from the fuel cell system to prevent damage due to freezing while the fuel cell is not operating. The majority of the liquid water within the fuel cell stack can be removed at system shut-down using a gravity self-drain. Residual water within the stack can be removed by blowing dry, de-humidified air through the fuel cell stack just prior to system shut down. In these systems, water must be added before the fuel cell can be operated.

In other approaches, thermal insulation is placed around the entire fuel cell stack and the water reservoir to slow heat loss during operation and dwell times. The insulation is often integrated with the fuel cell stack casing. This approach increases stack volume and weight. Since fuel cell stack weight affects vehicle performance, installed power requirements, and cost, vehicle suppliers have an incentive to use other approaches that do not increase stack weight. Lowering fuel cell stack weight lowers thermal mass, decreases warm-up times but also decreases cool-down times.

Still other approaches involve operating the fuel cell to produce waste heat that is used to heat the fuel cell stack as part of the startup process. Advantages of this system include a relatively simple design that typically requires no system changes. Disadvantages of this system include the requirement for long warm-up times at sub-freezing temperatures because the fuel cell stack power is relatively low. This system also does not thaw ice in the anode and cathode flow channels directly. This system also does not address damage that may occur due to freezing when the fuel cell in the vehicle is not operating.

Other systems employ hot air from a compressor to melt ice in the anode and cathode flow channels and to warm the MEA during operation and/or as part of the start-up process. The hot air is typically greater than 90° C. and is available relatively quickly. Hot air warms all portions of the cathode. Disadvantages include the fact that not much heating power is derived from air (however, the thermal mass of the membrane electrode assembly is very low).

Other systems use hydrogen/air burners to warm stack coolant which, in turn, warms the fuel cell stack. Advantages of this heating system includes the generation of a large amount of high-quality heat. Waste heat can be used to warm the passenger compartment. Disadvantages include the decrease in fuel economy and the requirement for the hydrogen/air burners that add weight, volume and cost to the fuel cell system.

Most of the preceding systems relate to the warming of the fuel cell stack at start-up or during vehicle operation but do not prevent damage that may be caused when the fuel cell stack remains in a dwell or off-mode at low ambient temperatures. Systems addressing the dwell-mode problem often include external plug-in resistive heaters. While consumers have accepted plug-in heaters for temperatures below −20° C., plug-in heater requirements for −20° C. to 0° C. are probably commercially unacceptable. Other solutions include a heated garage that is also probably commercially unacceptable.

SUMMARY OF THE INVENTION

An energy management system according to the invention controls the temperature of a fuel cell of a vehicle while the vehicle is not running. The energy management system includes a fuel cell stack, a blower that provides air to the fuel cell stack, a water supply, and a hydrogen supply. A hydrogen supply valve is connected between the hydrogen supply and the fuel cell stack. A heater is connected to an output of the fuel cell stack. A controller controls the hydrogen supply valve and the blower to power the heater to warm the fuel cell stack and the water supply while the vehicle is not running.

In other features of the invention, the heater is a resistive heater. A pressure sensor generates a hydrogen pressure signal for the hydrogen supply and is connected to the controller. A stack temperature sensor is connected to the controller and generates a stack temperature signal. The controller determines whether heating is necessary based on the stack temperature if the hydrogen pressure signal exceeds a first pressure value. The controller starts the blower and opens the hydrogen supply valve if heating is necessary until the stack temperature signal exceeds a first stack temperature value.

In yet other features of the invention, an ambient temperature sensor generates an ambient temperature signal. A water tank sensor generates a water temperature signal. The controller uses the stack temperature signal, the ambient temperature signal and the water temperature signal to access a lookup table to determine whether heating is necessary when the pressure signal does not exceed a first pressure value.

In other features, a hydrogen tank level sensor generates a tank level signal. The controller starts the blower and opens the hydrogen supply valve if heating is necessary and if the tank level signal exceeds a first tank level value. The controller continues heating until the stack temperature signal exceeds a first stack temperature valve. The controller activates a purge, drains water from the water supply, and inhibits vehicle startup if the tank level signal does not exceed a first tank level value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
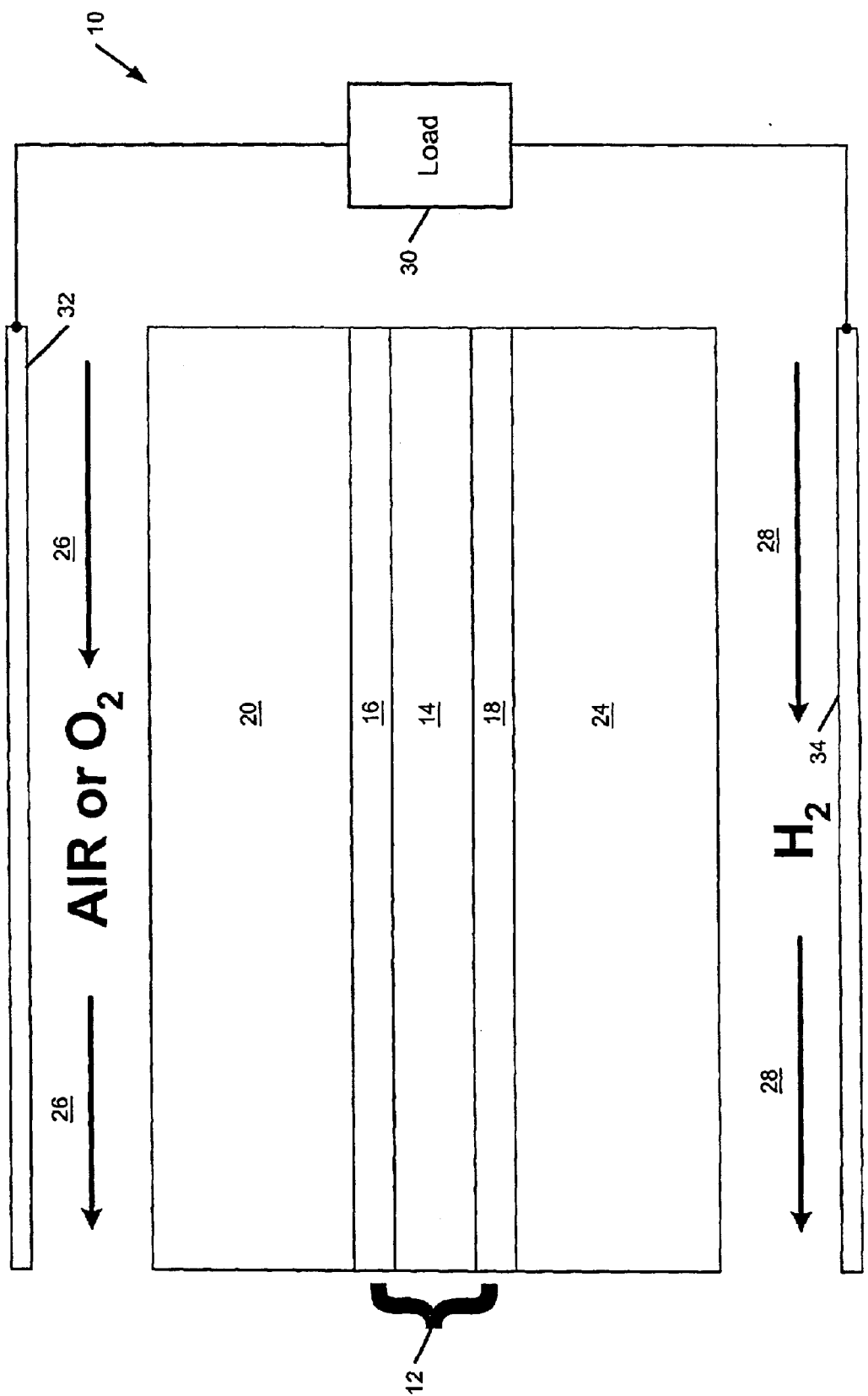
FIG. 1 illustrates an exemplary membrane electrode assembly (MEA) of a fuel cell.

Referring now to FIG. 1, a cross-section of a fuel cell assembly 10 that includes a membrane electrode assembly (MEA) 12 is shown. Preferably, the MEA 12 is a proton exchange membrane (PEM). The MEA 12 includes a membrane 14, a cathode 16, and an anode 18. The membrane 14 is sandwiched between an inner surface of the cathode 16 and an inner surface of the anode 18. A cathode diffusion medium 20 is located adjacent to an outer surface of the cathode 16. An anode diffusion medium 24 is located adjacent to an outer surface of the anode 18. The fuel cell assembly 10 further includes a cathode flow line 26 and anode flow line 28. The cathode flow line 26 receives and directs oxygen $O_2$ from a source to the cathode diffusion medium 20. The anode flow line 28 receives and directs hydrogen $H_2$ from a source to the anode diffusion medium 24.

In the fuel cell assembly 10, the membrane 14 is a cation permeable, proton conductive membrane having $H^+$ ions as the mobile ion. The fuel gas is hydrogen $H_2$ and the oxidant is oxygen $O_2$. The overall cell reaction is the oxidation of hydrogen to water and the respective reactions at the anode 18 and the cathode 16 are as follows:

Since hydrogen is used as the fuel gas, the product of the overall cell reaction is water. Typically, the water that is produced is rejected at the cathode 16, which is a porous electrode including an electrocatalyst layer on the oxygen side. The water may be collected as it is formed and carried away from the MEA 12 of the fuel cell assembly 10 in any conventional manner.

The cell reaction produces a proton exchange in a direction from the anode diffusion medium 24 towards the cathode diffusion medium 20. In this manner, the fuel cell assembly 10 produces electricity. An electrical load 30 is electrically connected across the MEA 12 to a plate 32 and a plate 34. If the plates 32 and 34 are adjacent to another fuel cell, the plates 32 and/or 34 are bipolar. If another fuel cell is not adjacent thereto, the plates 32 and/or 34 are end plates.

Figure 2:
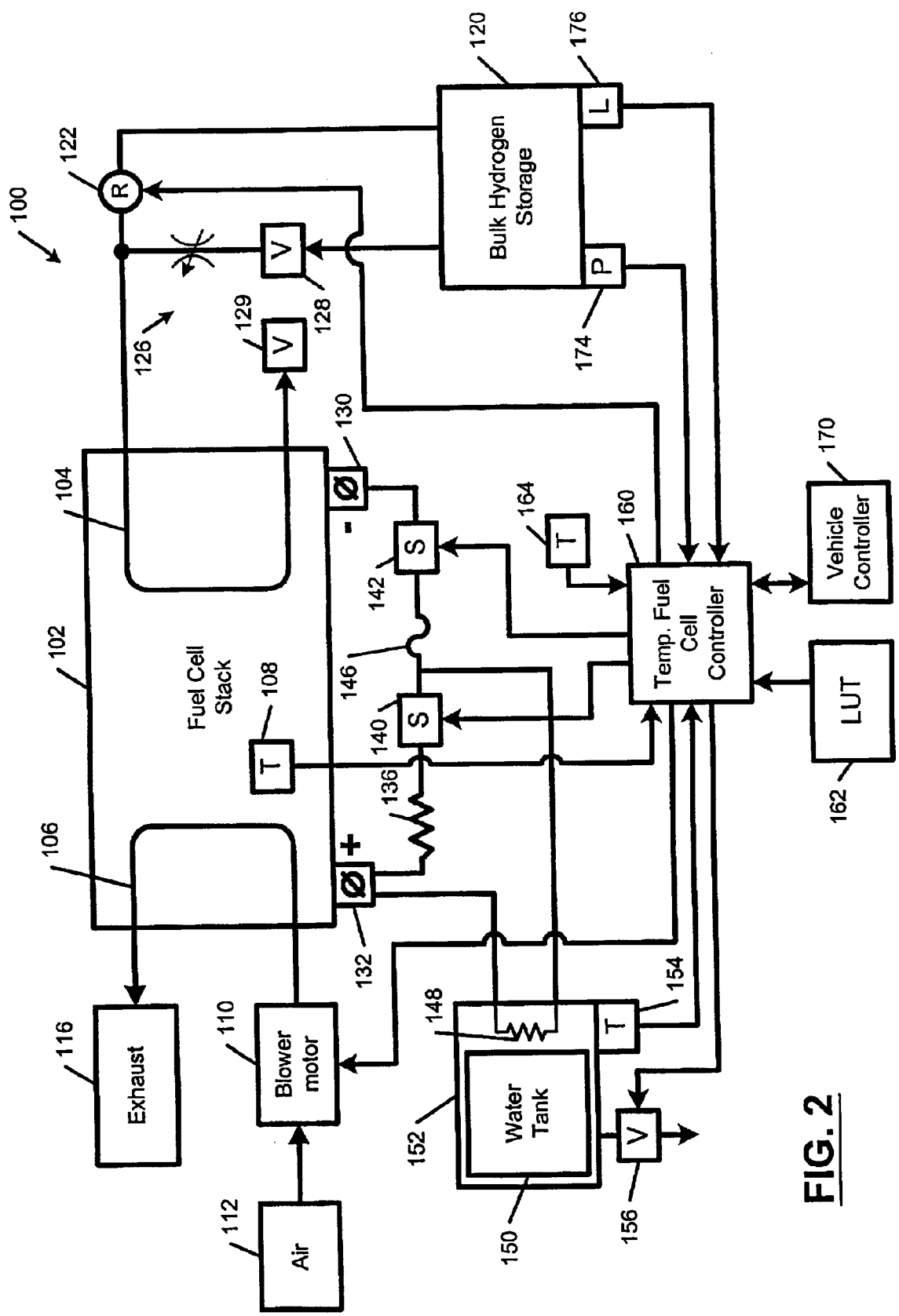
FIG. 2 illustrates a fuel cell energy management system for cold environments according to the present invention.

Referring now to FIG. 2, an energy management system for a fuel cell according to the present invention is illustrated and is generally designated 100. A fuel cell stack 102 includes an anode flow line 104 and a cathode flow line 106. A temperature sensor 108 measures an internal temperature of the fuel cell stack 102. A blower motor 110 provides air 112 to the cathode flow line 106. Air exiting the cathode flow line 106 is routed to an exhaust 116. A bulk liquid hydrogen storage tank 120 provides hydrogen to the anode flow line 104 through a valve 122. The hydrogen storage tank 120 stores liquid hydrogen at temperatures below −250° C. The hydrogen storage tank 120 is preferably an insulated and reinforced tank made of a composite material. A restrictor valve 126 and a check valve 128 are periodically opened to relieve pressure and to "burp" the system. A shutoff valve 129 can optionally be provided at an outlet end of the anode flow line 104.

The fuel cell stack 102 includes an anode terminal 130 and a cathode terminal 132. When hydrogen and air are supplied to the anode flow line 104 and the cathode flow line 106, respectively, the fuel cell stack 102 generates voltage across the anode terminal and cathode terminals 132. During normal operation, the fuel cell stack 102 provides power to one or more batteries, motors, or other loads (not shown in FIG. 2).

One end of a first resistive heater 136 is connected the cathode terminal 132. The first resistive heater 136 is preferably located near the fuel cell stack 102. An opposite end of the first resistive heater 136 is connected to a solenoid switch 140. A second solenoid switch 142 is connected between a fuse 146 and the anode terminal 130. A second resistive heater 148 is located in proximity to a water tank 150 that stores water. In a preferred mode, the second resistive heater 148 and the water tank 150 are located inside a container 152. A temperature sensor 154 senses the temperature of the water in the water tank 150. A solenoid valve 156 controls the flow of water from the water tank 150.

A fuel cell controller 160 that manages fuel cell temperature and energy includes a microprocessor, memory (such as read only memory, random access memory, and/or flash memory), and an input/output I/O interface (all not shown). The fuel cell controller 160 is connected to an ambient temperature sensor 164 that generates an ambient temperature signal. A calibration lookup table (LUT) 162 that is associated with the fuel cell controller 160 defines a relationship between the internal stack temperature, the ambient temperature, the water tank temperature, and the need for heating when the vehicle is in park and is not running. The fuel cell controller 160 is connected to a vehicle controller 170. The vehicle controller 170 provides signals identifying whether the vehicle is in park and/or whether the vehicle is running. A pressure sensor 174 provides a pressure signal for the hydrogen that is stored in the hydrogen storage tank 120. A tank level sensor 176 provides a tank level signal that indicates the level of hydrogen in the hydrogen storage tank 120.

Figure 3:
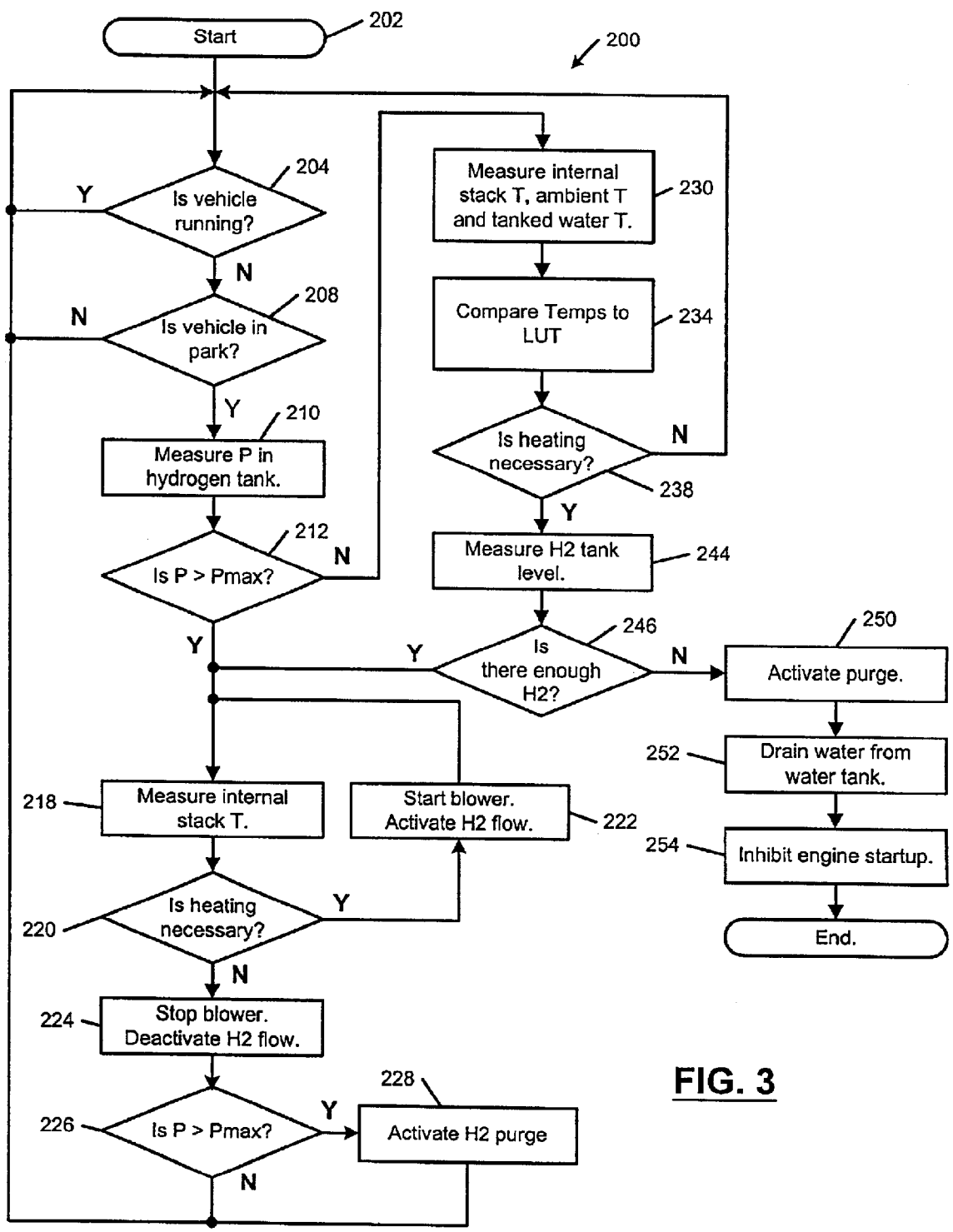
FIG. 3 illustrates steps for operating the fuel cell energy management system of FIG. 2.

Referring now to FIG. 3, steps for operating the fuel cell controller 160 are shown and are generally designated 200. Control begins at step 202. In step 204, the fuel cell controller 160 determines whether the vehicle is running. If the vehicle is running, control loops back to step 204. For safety reasons, temperature and energy management does not occur if the vehicle is running or not in park. If the vehicle is not running, control continues with step 208 where the fuel cell controller 160 determines whether the vehicle is in park. If not, control loops back to step 204. The fuel cell controller 160 preferably obtains running and park status information from the vehicle controller 170.

If the vehicle is in park and is not running, control continues with step 210. In step 210, the fuel cell controller 160 measures the pressure in the hydrogen storage tank 120. In step 212, the fuel cell controller 160 determines whether the pressure P exceeds the maximum pressure $P_{max}$. If the measured pressure P exceeds the maximum pressure $P_{max}$, control continues with step 218. In step 218, the fuel cell controller 160 measures the stack temperature using the stack temperature sensor 108. In step 220, the fuel cell controller 160 determines whether heating of the fuel cell stack 102 and the water supply 150 is necessary. If additional heating is necessary, control continues with step 222. In step 222, the fuel cell controller 160 starts the blower motor 110 and activates hydrogen flow using the hydrogen supply valve 122. Control continues with steps 218 and 220 until heating is no longer necessary. Then, control continues with step 224 where the fuel cell controller 160 stops the blower motor 110 and deactivates the hydrogen flow using the hydrogen supply valve 122. In step 226, the fuel cell controller 160 determines whether $P>P_{max}$. If it is, the fuel cell controller 160 activates a hydrogen purge in step 228 and control continues with step 204. If P is not greater than $P_{max}$, control continues from step 226 to step 204.

If the measured pressure P does not exceed the maximum pressure $P_{max}$ as determined in step 212, control continues with step 230 where the fuel cell controller 160 measures the stack temperature, the ambient temperature and the water temperature. In step 234, the fuel cell controller 160 uses the measured temperatures to access the LUT 162 or calibration table. In step 238, the fuel cell controller 160 determines whether heating is necessary using the LUT 162. If heating is not necessary, the fuel cell controller 160 loops to step 204. Otherwise, the fuel cell controller 160 continues with step 244 where the fuel cell controller 160 measures the level of the hydrogen storage tank 120 using the level sensor 176.

In step 246, the fuel cell controller 160 determines whether there is sufficient hydrogen available. If there is, the fuel cell controller 160 continues with step 218. If sufficient hydrogen is not available, the fuel cell controller 160 continues with step 250 and activates a purge. In step 252, water is drained from the water tank using the valve 156. In step 254, engine startup is inhibited to prevent damage to the fuel cell stack. Step 254 is preferably accomplished by sending an inhibit or disable signal from the fuel cell controller 160 to the vehicle controller 170.

Before running the fuel cell to generate heat, the fuel cell controller 160 confirms that the vehicle is not running and is in park. These steps prevent dangerous operation of the fuel cell system. Next, the fuel cell controller 160 determines whether the hydrogen pressure P is above $P_{max}$. If $P>P_{max}$, the fuel cell controller 160 operates the fuel cell stack 102 by initiating the flow of air and hydrogen. The fuel cell controller 160 operates the fuel cell stack 102 until the desired heating has occurred. Subsequently, the fuel cell controller 160 stops the blower and deactivates the hydrogen flow.

If the hydrogen pressure P is less than $P_{max}$, the fuel cell controller 160 measures internal stack temperature, the ambient temperature and the water tank temperature and determines whether heating is necessary. If heating is necessary, the fuel cell controller 160 determines whether there is sufficient hydrogen available. If not, the fuel cell controller 160 purges the system, drains water from the water tank and inhibits engine startup to prevent damage due to freezing.

As can be appreciated from the foregoing, the fuel cell energy management system according to the present invention prevents damage to the fuel cell stack and other system components due to cold environments. In addition, by managing the temperature of the fuel cell stack when the vehicle is in park and not running, the present invention reduces the amount of time that is required to heat the fuel cell system to typical operating temperatures. Furthermore, the fuel cell energy management system according to the invention solves the problem of freezing water at low ambient temperatures without increasing weight or volume.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, the specification and the following claims.

What is claimed is:

1. An energy management system for controlling the temperature of a fuel cell of a vehicle while the vehicle is not running, comprising:

a fuel cell stack;

a blower that provides air to said fuel cell stack;

a water supply;

a hydrogen supply;

a hydrogen supply valve connected between said hydrogen supply and said fuel cell stack;

a heater that is connected to an output of said fuel cell stack and arranged to warm said stack and said water supply;

a fuel cell controller that controls said hydrogen supply valve and said blower to power said heater to warm said fuel cell stack and said water supply while said vehicle is not running; and a vehicle controller interfaced with said fuel cell controller that triggers said fuel cell controller when said vehicle is not running.

2. The energy management system of claim 1 wherein said heater is a resistive heater.

3. The energy management system of claim 1 further comprising:

a pressure sensor that generates a hydrogen pressure signal for said hydrogen supply and that is connected to said fuel cell controller.

4. The energy management system of claim 3 further comprising:

a stack temperature sensor that is connected to said fuel cell controller and that generates a stack temperature signal.

5. The energy management system of claim 4 wherein said fuel cell controller determines whether heating is necessary based on said stack temperature if said hydrogen pressure signal exceeds a first pressure value.

6. The energy management system of claim 5 wherein said fuel cell controller starts said blower and opens said hydrogen supply valve if heating is necessary until said stack temperature signal exceeds a first stack temperature value.

7. The energy management system of claim 4 further comprising:

an ambient temperature sensor that generates an ambient temperature signal; and a water tank sensor that generates a water temperature signal.

8. The energy management system of claim 7 wherein said fuel cell controller uses said stack temperature signal, said ambient temperature signal and said water temperature signal to access a lookup table to determine whether heating is necessary when said pressure signal does not exceed a first pressure value.

9. The energy management system of claim 8 further comprising:

a hydrogen tank level sensor that generates a tank level signal.

10. The energy management system of claim 9 wherein said fuel cell controller starts said blower and opens said hydrogen supply valve if heating is necessary and if said tank level signal exceeds a first tank level value.

11. The energy management system of claim 10 wherein said fuel cell controller continues heating until said stack temperature signal exceeds a first stack temperature value.

12. The energy management system of claim 9 wherein said fuel cell controller activates a purge, drains water from said water supply, and inhibits vehicle startup if said tank level signal does not exceed a first tank level value.

13. The energy management system of claim 1 further comprising the step of:

a stack temperature sensor that is connected to said fuel cell controller and that generates a stack temperature signal;

an ambient temperature sensor that generates an ambient temperature signal; and a water tank sensor that generates a water temperature signal.

14. The energy management system of claim 13 further comprising:

a hydrogen tank level sensor that generates a tank level signal.

15. The energy management system of claim 14 wherein said fuel cell controller starts said blower and opens said hydrogen supply valve if heating is necessary and if said tank level signal exceeds a first tank level value.

16. The energy management system of claim 15 wherein said fuel cell controller continues heating until said stack temperature signal exceeds a first stack temperature value.

17. The energy management system of claim 14 wherein said fuel cell controller activates a purge, drains water from said water supply, and inhibits initiation of a load demand if said tank level signal does not exceed a first tank level value.

18. An energy management method for controlling the temperature of a fuel cell of a vehicle while the vehicle is not running, comprising the steps of:

providing a vehicle controller, a fuel cell stack, a blower, a water supply, a hydrogen storage device, a hydrogen supply valve, a heater that is connected to an output of said fuel cell stack, and a fuel cell controller;

connecting said fuel cell controller to said vehicle controller, said hydrogen supply valve, said blower and said heater; and triggering said fuel cell controller via said vehicle controller while said vehicle is not running, to control said hydrogen supply valve and said blower to generate heat that warms said fuel cell stack and said water supply.

19. The method of claim 18 wherein said heater is a resistive heater.

20. The method of claim 18 further comprising the step of:

generating a hydrogen pressure signal of said hydrogen supply using a pressure sensor that is connected to said fuel cell controller.

21. The method of claim 20 further comprising the step of:

connecting a stack temperature sensor to said fuel cell controller; and generating a stack temperature signal using said stack temperature sensor.

22. The method of claim 21 further comprising the steps of:

determining whether said pressure signal exceeds a first pressure value; and determining whether heating is necessary based on said stack temperature if said pressure signal exceeds said first pressure value.

23. The method of claim 22 further comprising the step of:

starting said blower and opening said hydrogen supply valve if heating is necessary until said stack temperature signal reaches a first stack temperature value.

24. The method of claim 21 further comprising the step of:

connecting an ambient temperature sensor and a water temperature sensor to said fuel cell controller;

generating an ambient temperature signal using said ambient temperature sensor; and generating a water temperature signal using said water temperature sensor.

25. The method of claim 24 further comprising the step of:

using said stack temperature signal, said ambient temperature signal and said water temperature signal to access a lookup table to determine whether heating is necessary if said pressure signal does not exceed a first pressure value.

26. The method of claim 25 further comprising the step of:
connecting a tank level sensor to said fuel cell controller; and
generating a tank level signal using a hydrogen tank level sensor.

27. The method of claim 26 further comprising the step of:
starting said blower and opening said hydrogen supply valve if heating is necessary until said stack temperature reaches a first stack temperature value and if said tank level signal exceeds a first tank level value.

28. The method of claim 26 further comprising the step of:
activating a purge, draining water from said water storage device, and inhibiting vehicle startup if said tank level signal does not exceed a first tank level value.

29. The method of claim 18 further comprising the step of:
connecting a stack temperature sensor to said fuel cell controller;
generating a stack temperature signal using said stack temperature sensor; and
starting said blower and opening said hydrogen supply valve if heating is necessary until said stack temperature signal reaches a first stack temperature value.

30. The method of claim 18 further comprising the step of:
connecting a stack temperature sensor to said fuel cell controller;
generating a stack temperature signal using said stack temperature sensor;
connecting an ambient temperature sensor and a water temperature sensor to said fuel cell controller;
generating an ambient temperature signal using said ambient temperature sensor; and
generating a water temperature signal using said water temperature sensor;
using said stack temperature signal, said ambient temperature signal and said water temperature signal to access a lookup table to determine whether heating is necessary.

31. The method of claim 30 further comprising the step of:
connecting a tank level sensor to said fuel cell controller; and
generating a tank level signal using a hydrogen tank level sensor; and
starting said blower and opening said hydrogen supply valve if heating is necessary until said stack temperature reaches a first stack temperature value and if said tank level signal exceeds a first tank level value.

32. The method of claim 31 further comprising the step of:
activating a purge, draining water from said water storage device, and inhibiting initiation of a load demand if said tank level signal does not exceed a first tank level value.

33. An energy management system for controlling the temperature of a fuel cell system when said system is not satisfying an external demand such as while a vehicle is not running, comprising:
a fuel cell stack;
a blower that provides air to said fuel cell stack;
a water supply;
a hydrogen supply;
a hydrogen supply valve connected between said hydrogen supply and said fuel cell stack;
a heater that is connected to an output of said fuel cell stack and arranged to warm said stack and said water supply; and
a controller that controls said hydrogen supply valve and said blower to power said heater to warm said fuel cell stack and said water supply while said system is not satisfying said external demand and wherein said controller determines whether heating is necessary based on said stack temperature if said hydrogen pressure signal exceeds a first pressure value.

* * * * *